July 17, 1956 P. J. HOMAN 2,754,981

SIDE CHARGED HORIZONTAL COKE OVEN BATTERY AND METHOD

Filed March 12, 1953 7 Sheets-Sheet 1

INVENTOR.
PAUL JAMES HOMAN.

BY
Thomas J. P. O'Brien
HIS ATTORNEY.

SIDE CHARGED HORIZONTAL COKE OVEN BATTERY AND METHOD

Filed March 12, 1953 7 Sheets-Sheet 2

INVENTOR.
PAUL JAMES HOMAN.
BY Thomas J. P. O'Brien
HIS ATTORNEY

SIDE CHARGED HORIZONTAL COKE OVEN BATTERY AND METHOD

Filed March 12, 1953 7 Sheets-Sheet 3

INVENTOR.
PAUL JAMES HOMAN
BY
Thomas J. P. O'Brien
his ATTORNEY.

SIDE CHARGED HORIZONTAL COKE OVEN BATTERY AND METHOD
Filed March 12, 1953 7 Sheets-Sheet 4
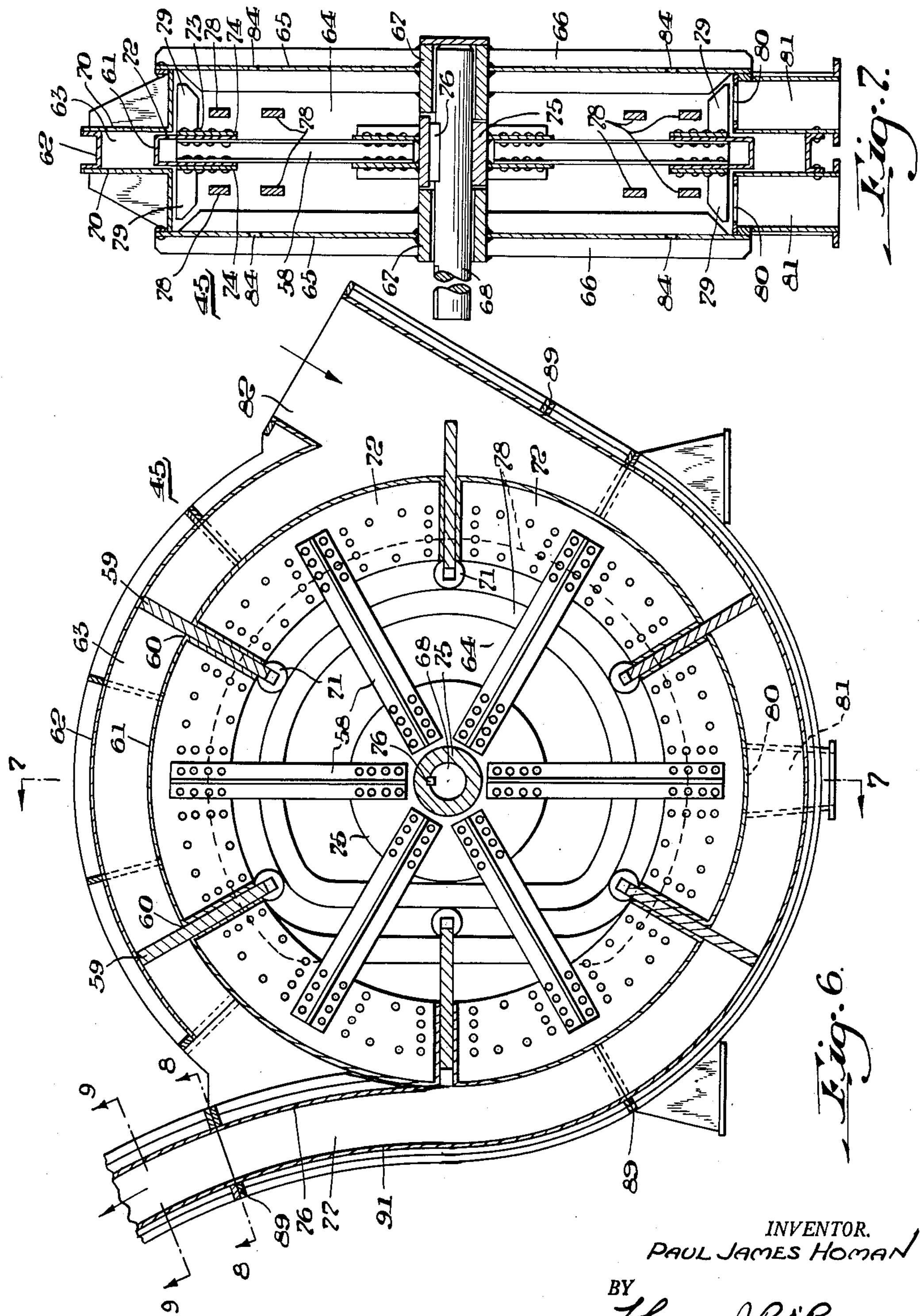
INVENTOR.
PAUL JAMES HOMAN
BY
Thomas J. P. O'Brien
his ATTORNEY.

July 17, 1956 P. J. HOMAN 2,754,981
SIDE CHARGED HORIZONTAL COKE OVEN BATTERY AND METHOD
Filed March 12, 1953 7 Sheets-Sheet 5
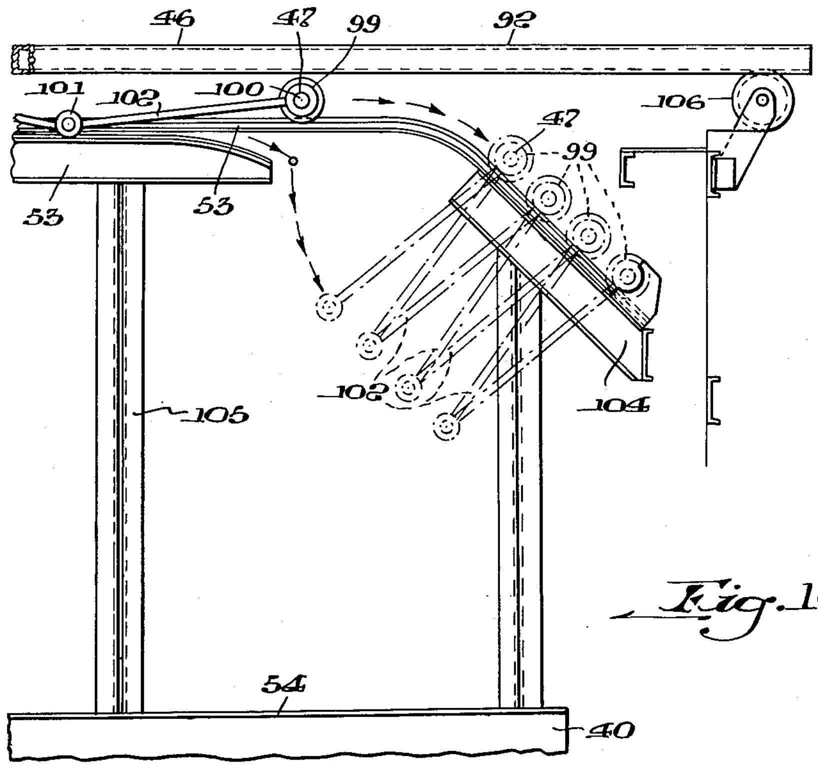
Fig. 10.
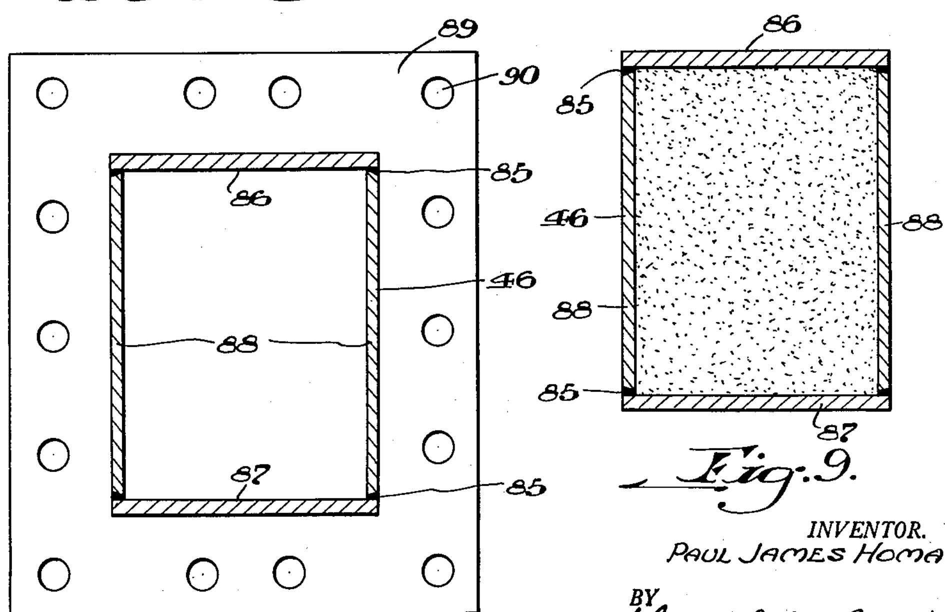
Fig. 8.
Fig. 9.
INVENTOR.
PAUL JAMES HOMAN
BY
Thomas J. P. O'Brien
his ATTORNEY July 17, 1956 P. J. HOMAN 2,754,981

SIDE CHARGED HORIZONTAL COKE OVEN BATTERY AND METHOD

Filed March 12, 1953 7 Sheets-Sheet 6

INVENTOR.
PAUL JAMES HOMAN

BY
Thomas J. P. O'Brien
his ATTORNEY

July 17, 1956 P. J. HOMAN 2,754,981

SIDE CHARGED HORIZONTAL COKE OVEN BATTERY AND METHOD

Filed March 12, 1953 7 Sheets-Sheet 7

INVENTOR.
PAUL JAMES HOMAN

BY Thomas J. P. O'Brien
his ATTORNEY

United States Patent Office 2,754,981

Patented July 17, 1956

2,754,981

SIDE CHARGED HORIZONTAL COKE OVEN BATTERY AND METHOD

Paul J. Homan, Pittsburgh, Pa., assignor to Koppers Company, Inc., a corporation of Delaware Application March 12, 1953, Serial No. 341,905

9 Claims. (Cl. 214—21)

This invention relates in general to improvements in the construction and operation of horizontal coke oven batteries, and more particularly to improved method and apparatus for charging and leveling modern horizontal coking retort ovens with coal charges, by side charging of the same by a rotary positive displacement pump rather than top charging as is now universally conventional in modern commercial practice with the higher horizontal coke ovens that are standard today.

In the operation of present day horizontal coke oven batteries, the universal and conventional practice in commercial operation of such higher horizontal coke oven batteries is to charge them through their tops from above by means of larry cars which run on rails along the top of the batteries. The larry cars discharge the coal from their hoppers into the horizontal oven chambers through charging holes in the oven roof. The tops of the oven charges are then leveled by reciprocating a leveler bar or ram located on a pusher machine which runs on tracks along the pusher side of the battery, through a leveler doorway located in the upper part of the pusher side ends of the coking chambers.

The oven charges are removed from the chambers when coked by pushing the same as a cake horizontally out of the same, and for this purpose the oven chambers are provided at their opposite horizontal ends with coke oven doors which are removed for insertion of the pusher ram at one end and a coke guide at the opposite end through which the coke passes out onto quenching means.

In such coke ovens the leveler doorway is usually provided in the upper part of the pusher side coke oven doors and is closed by a chock door.

Many years ago, it was customary to side charge low horizontal coke oven batteries through the leveler doorways of the oven chambers, but with the later increase in height of such coke ovens the former methods and apparatus, with the advantages of such side charging, were discontinued in favor of top charging notwithstanding the disadvantages of top charging hereinafter enumerated.

The methods and apparatus previously commercially useful, in side charging the low horizontal coke ovens with low coal charges, in the early stages of the development of that horizontal by-product coke oven were found impractical with the later developed high chambered ovens.

The modern high ovens are all characterized by long, high and narrow chambers, in which the full charge must be introduced into a fully empty oven in a very short period of time to produce a leveled charge of uniform density, in a smokeles manner, with comparative ease and facility to maintain the requisite pushing schedule for recharging the chambers of the battery in a predetermined time and sequence.

Notwithstanding the advantages of side charging over top charging of such ovens, top charging of the higher ovens has since universally prevailed in industry for lack of a practical, efficient, and simple method and apparatus for side charging of the high ovens in a manner that is acceptable for the purpose in this industry.

The present invention is directed to the provision of a method and apparatus of side charging of horizontal coking retort oven batteries through the usual leveler door, or an equivalent doorway, at the top of the doors at one or both horizontal ends of these high chambered ovens in replacement of top charging which has prevailed since the change from low to high ovens, and in a manner presently acceptable to the industry, in order to attain the following advantages and eliminate the following disadvantages.

The larry car, charging hole castings, larry car rails, larry car conductor rails and supports, larry floor extensions at ends of battery, and larry rail chairs and braces, are all eliminated from the top of the battery. Coal storage bin can be removed from the line of batteries, thus providing space for additional ovens. Labor on top of battery and power used to elevate the coal is reduced. Material handling system is simplified. Vibration on oven brickwork by a larry car on top of oven battery is eliminated. The design of the oven brickwork is simplified by eliminating the necessity of supporting the larry car on top of the battery and by the elimination of the charging holes. Smokeless charging is accomplished. Live load on battery foundation is reduced, resulting in saving of concrete and labor. Cross over mains can be lowered. Liquor flushing return piping for double collecting main batteries can be simplified. Operating conditions for the pusher machine operator are improved. Leveler bar and its drive are eliminated resulting in a lighter and simplified pusher machine. Operating conditions on top of the battery are improved. Speed up of pushing and charging schedule is possible.

An important feature of the present method and apparatus is that the side charging and leveling operatings are combined, using the same equipment, under the control of the same operator, and the side charging is effected in a manner whereby the ovens are refilled with more uniform charging and a more uniform bulk density of the coal in all of the ovens than is posible with the method and apparatus heretofore proposed for such top or such prior art side charging.

Other objects and advantages of the invention will be apparent from the following description of the method and apparatus of the present invention.

In accordance with the present invention, modern high chambered horizontal coking retort oven batteries are charged with coal through the conventional leveler bar doorways at one side of the battery, without disadvantageously altering the predetermined character of the mix and bulk density of the coal intended for the charges in the ovens, to attain uniformity of coke in the several ovens of the battery equal to that of top charging, by means of a combined charging and leveling operation in which the coal from the battery supply hoppers containing the coal as previously ground and mixed as conventional, to provide the predetermined bulk density in the several oven chambers of the battery, is fed into the oven chambers individually, and under continuous positive pressure by positive displacement continuously in such manner as to have the desired bulk density throughout the length and height of the respective oven chambers, to produce uniform coke throughout the entire masses of the charges in the several oven chambers by such side charging, notwithstanding the increase in height and length of the modern ovens as compared with the lower and shorter length chambers of the ovens in the early stages of the development of the modern by-product coke oven of the slot type for the production of blast furnace coke.

With the lower and shorter length ovens of the early art, it was possible to side charge such ovens by means of feeders including chutes and tubes through doors at the tops of pusher side coke oven doors since the distance the finely pulverized coal had to travel and fall on entering the short and low chambers was not so great as to substantially alter the mix and density of the coal charge, and the rate of charging was not so rapid as to affect the uniformity and bulk density during charging of the ovens in sequence, a longer time for filling the short and low ovens being permissible with the longer coking times and longer intervals for charging and discharging of the ovens, with the longer coking cycle of oven chambers in the earlier stages of the development of the coke oven art.

With the later development of higher and longer ovens, and shorter coking times, and faster sequence of operation of the ovens, to increase the output or capacity of such batteries, the former procedures for side charging had to be discontinued in favor of top charging through holes in the oven roof, to attain the faster sequence of charging without disadvantageously altering the bulk density of the coal charge, and uniformity of coking, throughout the entire mass of coal in each chamber.

The modern ovens are built as high narrow horizontally elongated chambers arranged in a row in alteration with heating walls containing combustion flue heating system, and with regenerators below and parallel to the coking chambers and heating walls, and these ovens are designed to be filled at a single filling operation in a few minutes, up to a level below the oven roof, so as to leave a free gas space along the top of the charge for off flow of the distillate gas, which is taken off through ascension pipes in the oven roof, and the heating system, which is located in the heating walls, is designed to confine all effective heating to a level just below the top level for finished coked charges so as to avoid overheating the gas in the gas collecting space along the top of the chambers above the charge. For fullest capacity the heating system is carried up to such a height below the oven chamber tops as to leave just sufficient space for off flow of the distillate gas to the ascension pipes. As a result, the oven top is located at a level just above or slightly higher than the top of the leveler door and coal charged in through the top charging holes in the oven roof heaps up into the same closing the gas space to through flow of gas to the ascension pipes until the coal is leveled by reciprocating a leveling ram through the leveler ram door or opening adjacent the top of the chambers at a level above the level of the top for finished coke charges. These leveler openings are conventionally provided in top of the pusher side door of the two coke oven doors provided at the opposite horizontal ends of each chamber for the horizontal discharge of the finished coke cakes from the ovens, and the ascension pipes are provided with steam jets for smokeless charging, to accelerate the off flow of larger volume of gas that is suddenly evolved on charging the oven chambers due to the more rapid charging of the modern higher capacity ovens.

According to this invention there is provided, for such combined charging and leveling of these ovens a coal feeding machine movable along one side of a battery of such chambers between the latter and the supply bin for the battery, and preferably along the tracks for the pusher machine, for conveying the entire coal charges for the several ovens to the individual chambers.

The machine is in the form of a charging unit and a traction unit for transporting the charging unit to and from the supply bin and for spotting the charging unit before the individual oven chamber doors at the pusher side of the battery.

The charging unit comprises a hopper to contain the entire charge of coal for filling an oven chamber in a single operation, and a charging tube for flow of coal from the hopper into the oven chambers, through the conventional leveler bar doorway, in the form of a continuous stream or flow of coal under positive pressure that fills the tube and flows through the same like liquid, and under continuous positive pressure of a rotary positive displacement pump so that each particle of coal while passing from the hopper to the oven chamber is in continuous flow under positive pressure, rather than intermittent flow under positive pressure as with a piston and under lines of positive force substantially axially only, or in parallelism with the direction of the length of the tube, rather than in part radially as with a screw conveyor. In this manner the coal as previously prepared for coking is not altered by packing as with a piston drive or pump, or churned, as by the screw, with segregation of the different sizes of the pulverized coal from its intended density and mix, during its conveyance throughout the length of the tube, from the supply bin to the interior of the individual oven chambers. Nor is the feed of fuel through the tube interrupted by plugs of coal, in the screw of the tube, as obtains with screw conveyors having a screw which extends only part way along the coal entrance portion to the tube.

For effecting this kind of flow, the charging unit is provided with a positive displacement coal pumping wheel rotatable continuously at high speed during the charging operation, for imparting such flow characteristics to the coal while passing from the hopper to the tube. The wheel is provided with a rim having an annular series of slots in spaced relation around the rim, a stationary annular casing which encloses the rim, preferably outwardly of the same, and forms with the rim an annular chamber, coal pushing blades or paddles mounted for reciprocation through the slots into and out of said annular chamber, and means for controlling the reciprocation of the blades to position them in, and retract them from coal pusher relation in the chamber. The coal hopper and tube are connected with the annular chamber at spaced points, and the rim and blades are mounted for rotation together as a unit relative to the stationary casing, so as to give the coal sufficient impetus under positive pressure continuously between the hopper and the tube as to cause the described continuous flow of coal through the tube under positive force. As the coal is pumped by positive displacement rather than blown, thrown, rammed, or skimmed through the tube, an outlet baffle is provided, at the junction of the tube with the annular chamber, which baffle is tangent to the rim of the wheel, and directs the coal out of the annular chamber and into and through the tube. The reciprocation of the blades is controlled to withdraw or retract the blades from the annular chamber individually as they approach the tube and its outlet baffle, and to advance or extend them back into the chamber, after they have progressed around the circle of rotation to a degree beyond the region of the outer baffle.

Coal filled into the chamber by the hopper is contained in individual pockets formed between the blades and is given momentum before they exert pushing force on coal that has previously entered the tube. As each pocket of coal arrives at the region of the outer baffle its rear blade is withdrawn and the individual pocket of coal behind pushes the pocket of coal ahead and on through the tube. With the high speed of continuous operation of the wheel required to fill an oven in the interval of time allowed for charging in the coking schedule or sequence, the coal flows like a liquid, or water, through the tube at a rate to fill a modern coke oven within three minutes, without segregation, packing or otherwise altering the predetermined character of the coal previously given it, before entering the supply bins, to provide the requisite uniform density of the coal when so delivered in the ovens, for uniformity of coking among all the ovens of the battery.

In operation, the portion of the coal feeding chamber between the tube and the hopper which is not filled with coal, acts as an air compression chamber due to the action of the re-extended blades, which force air from the empty pockets against the coal being fed into the chamber by the hopper on rotation of the blades from the region of the outlet baffle to the region of the hopper inlet. Such air is released by vents to the atmosphere, or by a pipe connection provided between that portion of the annular chamber and the coal hopper, whereby the compressed air of the empty pockets is discharged to the surrounding atmosphere, or utilized in the hopper at its coal outlet region, to agitate the coal and insure positive flow of coal from the hopper into the charging wheel chamber.

For discharge of the coal from the tube into the oven chambers, a tube is employed which may be inserted through the usual leveler doorway in the pusher side coke oven doors, and extend therein throughout the length of the oven, free of contact with the oven chamber walls, as a cantilever like the usual leveler bar does in the gas collecting space of such ovens. To this end the forward portion of the tube is mounted on the charging unit of the coal feeding machine in position for movement inwardly and outwardly of the chambers, through the leveler doorway of the pusher side coke oven doors. This tube portion is provided with means for controlled movement of the same into and through and out of the chambers, to first position the outlet end of the tube just inside the oven, whereupon the forward movement of the tube is stopped.

The means for controlling the movement of the tube is also operatively connected with means for rotating the coal pumping wheel for coordination and coaction of the tube and wheel as follows:

Upon stopping of the tube, the coal pumping wheel is started and a timer energized whereupon the coal pumps a triangular volume of coal into the oven bounded by the oven floor, the pusher side oven door, and the angle of repose of the particular kind of coal pumped in, whereupon the timer starts the further forward movement of the tube through the oven chamber top, toward the coke side door, while the coal pump continues to feed coal. The rates of the forward movement of the tube and the rate of rotation of the coal pump, are co-related so that a uniform charge is placed in the oven chamber to the height of the bottom of the charging tube, which is at the level of the bottom of the leveler door, the coal dropping by gravity from the open inner end of the tube and rolling down the slope of the previously charged coal to the oven floor.

During this forward movement, the tube is supported on the top of the coal charge as it progresses towards the coke side door. When the tube has advanced until the coal has been filled in on the floor to the region of the coke side door, the continuous rotation of the coal pump wheel is automatically gradually decelerated, to stop when the last unfilled triangular area of the oven chamber is filled up to the top level for charged coal alongside the coke side coke oven door. During this deceleration in feed by the pump, the forward speed of the tube is constant until its open end reaches the region of the coke oven door, whereupon the tube is automatically retracted to withdraw the tube from the oven chamber, the coal leveled, and the leveler door then closed.

Smoke evolved during such charging is continuously and uninterruptedly withdrawn through the ascension pipes under the action of the steam jets. The coal charge supports the tube from sagging under the weight of the free end of the tube and the heat of the oven. The tube being supported by a cantilever construction from outside the oven, there is no undue compression of the top of the coal charge by the tube.

The coal feeding unit also comprises a spillage hopper for collecting coal that may spill out of the open end of the tube on withdrawal from the leveler doorway, and a conveyor for the collected spillage back to the hopper on the coal feeding machine. And as there may be leakage of coal from the annular chamber to the interior of the annulus of the coal pump wheel, the invention further provides internal rotary scrapers and hoppers for conveyance of such coal from the interior of the coal pump wheel to the conveyor for return with spillage to the hopper that feeds the wheel.

In the preferred embodiment of the invention, movement of the forward portion of the tube into and out of the individual oven chambers is effected by forming the forward portion of the tube that is to extend into the oven chamber, as a single rigid unitary whole with a portion of the tube that is to remain outside the oven chambers and be connected with the annular chamber of the coal feed unit, and mounting such single tube and the coal feed pump and chamber and the hopper all together for movement as a unitary whole, on the traction unit, toward and from the oven chambers, the means for controlled movement of the forward portion of the tube being connected to operate such unitary whole toward and from the oven chambers.

With this preferred embodiment, the invention further provides on the traction unit a series of movable rollers or bearings for supporting the tube outside the oven chambers at the level of the leveler doors, oppositely disposed supports for the rollers, and foldable spacer elements for the rollers, which spacer elements are interconnected with the coal feed unit to fold up near the front of the coal feed unit and stack the rollers in an inclined plane, as the unit moves forward during charging, and to unfold in roller spacing and supporting relation as the unit is withdrawn from the oven chambers after a charging operation.

It will be understood, however, that the novel features and improvements of the invention are susceptible to other applications, such as for instance, the features of side charging as illustrated in conjunction with horizontal coking retort ovens, are also of utility in side charging intermittent vertical retorts by providing an equivalent opening in the top of such chambers for the side entrance of the coal feeding tube. Likewise, the invention is not limited in all its aspects to mounting the forward portion of the coal feeding tube as an integral part of the rest of the tube, for movement as a unit with the coal feed wheel pump and its hopper, and from the oven chambers, since the forward portion of the tube may be mounted for such movement in accordance with the next preferred embodiment of the invention by telescopic connection with the portion of the tube that is to remain outside the chambers during charging, and only such forward portion as enters the chambers moved to and fro by the means for the controlled forward movement of the tube. It will also be noted that the coal feeding unit may have utility per se in other relations than with coke ovens.

Hence, the scope of the invention is not confined in all its aspects to the specific embodiments herein described.

Referring to the drawings:

Figure 1 is a view partly in side elevation and partly in diagrammatic vertical cross-section of a side-charging machine combined with a horizontal coke oven battery in accordance with the present preferred embodiment of the invention;

Figure 6 is a vertical sectional view of the coal feed pump taken on the line 6—6 of Figure 4;

Figure 7 is a vertical sectional view taken transversely on the line 7—7 of Figure 6;

Figure 8 is a vertical cross sectional view of the coal feed tube taken on the line 8—8 of Figure 6;

Figure 9 is a vertical cross sectional view taken on the line 9—9 of Figure 6;

Figure 10 is a side elevational view illustrating the supporting mechanism for the forward end of the tube adjacent the side of a coke oven battery;

Figures 2, 3:
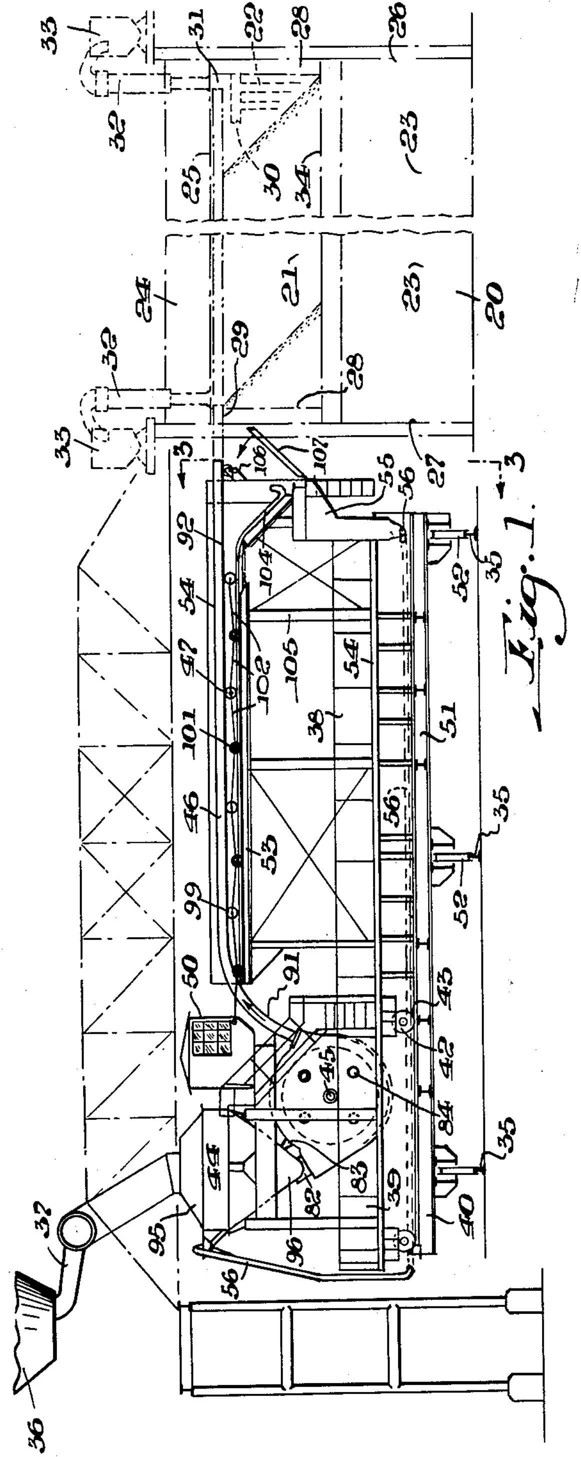
Figure 2 is a top plan view of the side-charging machine illustrated in Figure 1.
Figure 3 is an end elevational view of such machine taken from the front of the same on the line 3—3 of Figure 1.

In Figs. 1 to 11 of the drawings, 20 indicates a modern large horizontal coking retort oven battery of the type exemplified in U. S. Patent of Joseph Becker, 2,447,837, which comprises a series of alternate horizontally elongated coking chambers 21 and heating walls 22 arranged side by side in a row and provided with cross regenerators 23 therebeneath. Said ovens are of the high narrow type normally equipped with charging holes in its oven roof 24 on which larry cars run on rails on the roof for charging the individual ovens through their tops 25, all of which are eliminated by or, alternatively, are present but not used when the battery is operated in accordance with the present invention.

Figure 11:
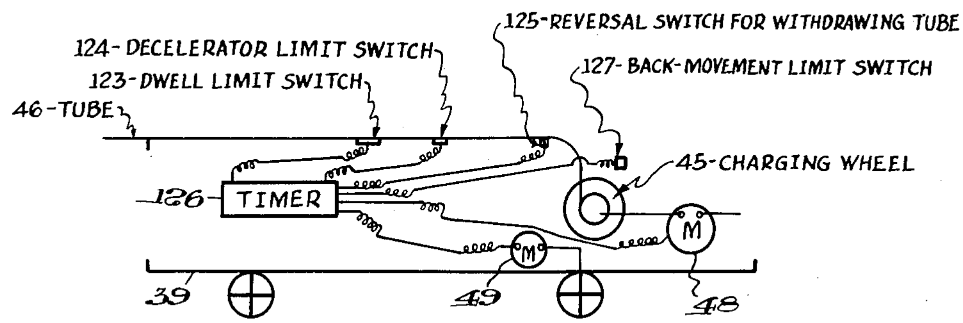
Figure 11 is a diagrammatic view illustrating by conventional symbols commonly employed in the coke oven art the synchronous control of the charging tube and its charging unit.
Figure 12:
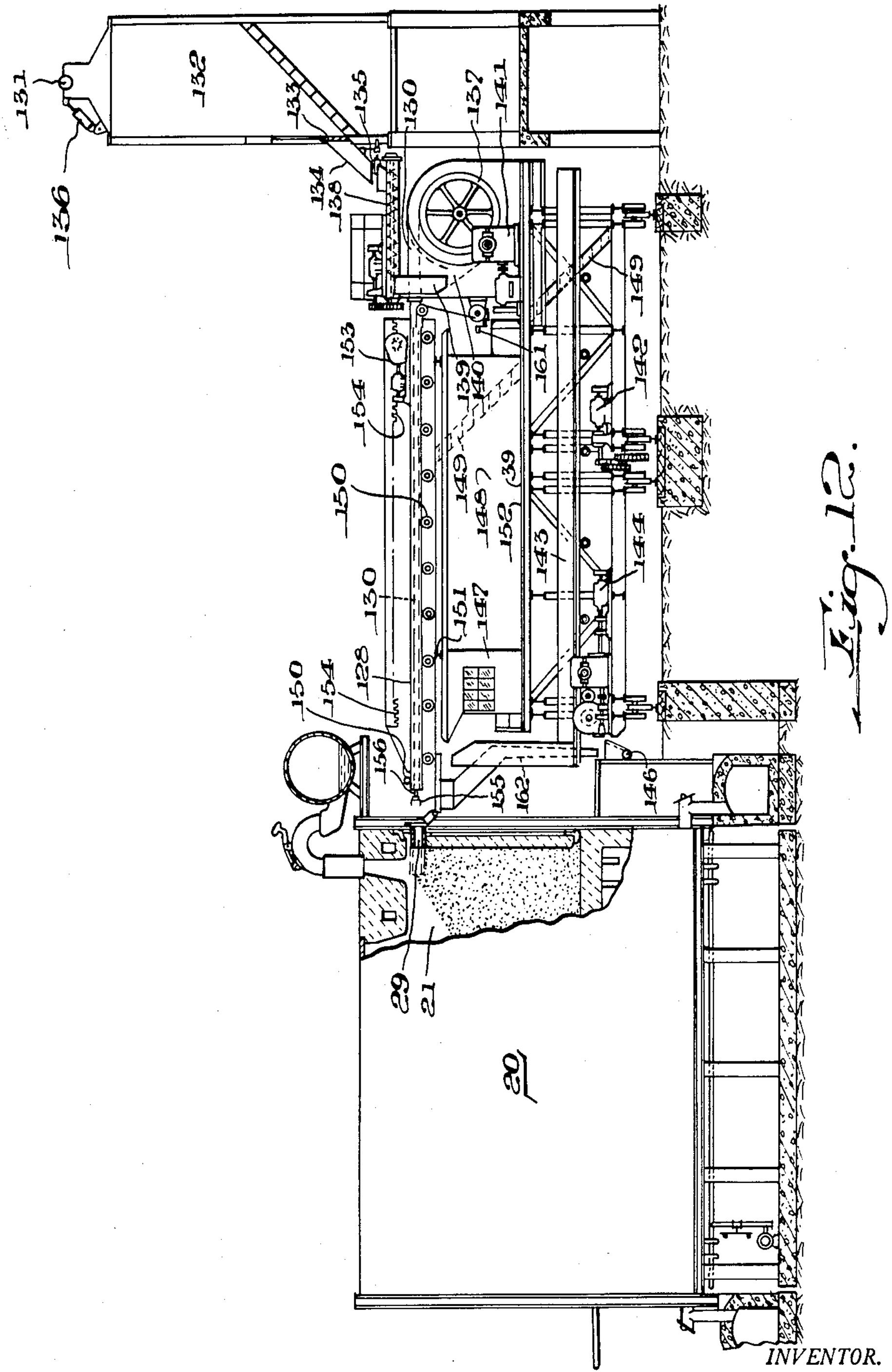
Figure 12 is a view partly in side elevation and partly in vertical cross section of a modified form of a side charging machine combined with a horizontal coke oven battery in accordance with the next preferred embodiment of the invention.

The coke side 26 and pusher side 27 doors are indicated at 28, the pusher side door having a doorway 29 and a door shown in Fig. 12, but not shown in Figs. 1–11, like the conventional leveler bar door and doorway, in its top. The tops 25 of the oven chambers 21 are at about the same level as the top of the leveler door 29, and the heating walls 22 alongside the coking chamber 21 are constituted of a heating system, as in said Becker patent, the top 30 of which system terminates at a level a short distance below the level of the bottom of the leveler doorway 29, which latter level is the level for leveled coal charges, thus leaving an unobstructed free gas space 31 along the top of the coal filled in the oven for off flow of distillate gas to the ascension pipes 32 on the oven roof 24, of which two are shown at opposite ends of the oven chamber and which discharge the gas into the collecting mains 33.

The coke oven doors 28 extend from the oven tops 25 down to the oven soles 34 and are removable for discharge of the coke by pushing the same horizontally out through the doorways on the coke side 26, for quenching outside the oven chambers.

This pushing is done in the conventional manner by means of a pusher ram (not shown) which is inserted into one end of the coking chambers 21 individually, in accordance with a chosen sequence or pushing schedule. The pusher ram is carried from oven chamber 21 to oven chamber 21 by a pusher machine that runs on tracks 35 at ground level alongside the pusher side 27 of the battery 20.

The battery 20 is equipped on the coke side 26, i. e. the right hand side of Fig. 1, with the usual coke side door machine and coke handling equipment (not shown).

On the pusher side 27, the battery 20 is equipped with the usual pusher machine (not shown) that also carries the pusher ram, and pusher side door handling machine, but the leveler bar which it customarily carries for insertion in the leveler doors to level the coal in top charging is omitted with the present invention.

In such coke oven batteries, the coal receiving equipment is located at a distance from the individual oven chambers 21 and a coal handling system is provided for preparing the received coal to clean, crush and mix it to provide, when charged into the oven chambers, the same coal mix and density for each and all ovens 21 of the battery 20. The prepared coal is stored in bins at one end of the battery 20 into which the coal for all the ovens 21 is contained and fed to the ovens in sequence. Heretofore has been done by larry hoppers which conventionally run along the oven roof 24 to the individual oven chamber tops.

Such system of coal supply may be, and is contemplated as being employed, but without the larry system, with the present method and apparatus for charging the ovens, but preferably the invention employs a novel bin system 36 in which the prepared coal to be charged is stored in a series of coal loading stations 37 arranged along the side of the pusher machine tracks 35 opposite the battery 20 and located about every 8th to 10th oven 21. These stations 37 are provided with gates for feeding coal to the charging unit to be delivered to the ovens between the stations 37.

These stations 37 thus may be more simply and economically constructed, since they are of small capacity and less height than conventional bins as designed as heretofore to hold the coal supply for an entire battery 20 of ovens 21 with a single discharge chute from the hoppers for all ovens. This new system lends itself to supply of preheated coal to the ovens, since the coal supplies in each station 37 is small, being only for a few of the ovens 21 of a battery 20, rather than the large volume, as a unit, for supply of all the ovens 21 of the battery 20. Heretofore it has been desired to preheat the coal for coking prior to charging in the ovens 21, to attain better coke and shorter coking times, but this advantage could not be attained in a practical manner heretofore, due to the necessity for preheating a supply of coal for all the ovens 21 of the entire battery in the form of a single large bulk of coal, as was necessary with the top charging system.

The employment of the present method and apparatus for side charging overcomes this difficulty, and permits the use of a series of small stations 37 at intervals alongside the battery 20 for refilling the oven charging unit, and thus provides the means whereby the coal to be charged into the individual oven chambers 21 may be preheated in small quantities just before charging it as hot coal into the ovens 21 in a manner to attain such advantages as may result in coking, by reason of coking such coal preheated prior to charging into the ovens 21 for coking therein.

The side charging machine 38 is composed of two units, the actual charging unit 39 and a traction unit 40 for supporting the charging unit in position before the individual oven chambers 21 during charging, and for transporting the charging unit 39 from oven 21 to oven 21, and to and from the conventional supply bins for the battery 20, as conventionally employed heretofore, or as in accordance with the present preferred embodiments of the invention, to and from between the individual ovens and the coal stages 37 individualized to groups of the oven chambers 21 of the battery 20 and disposed at spaced intervals alongside the same in front of the oven chambers on the pusher side 27.

Figure 4:
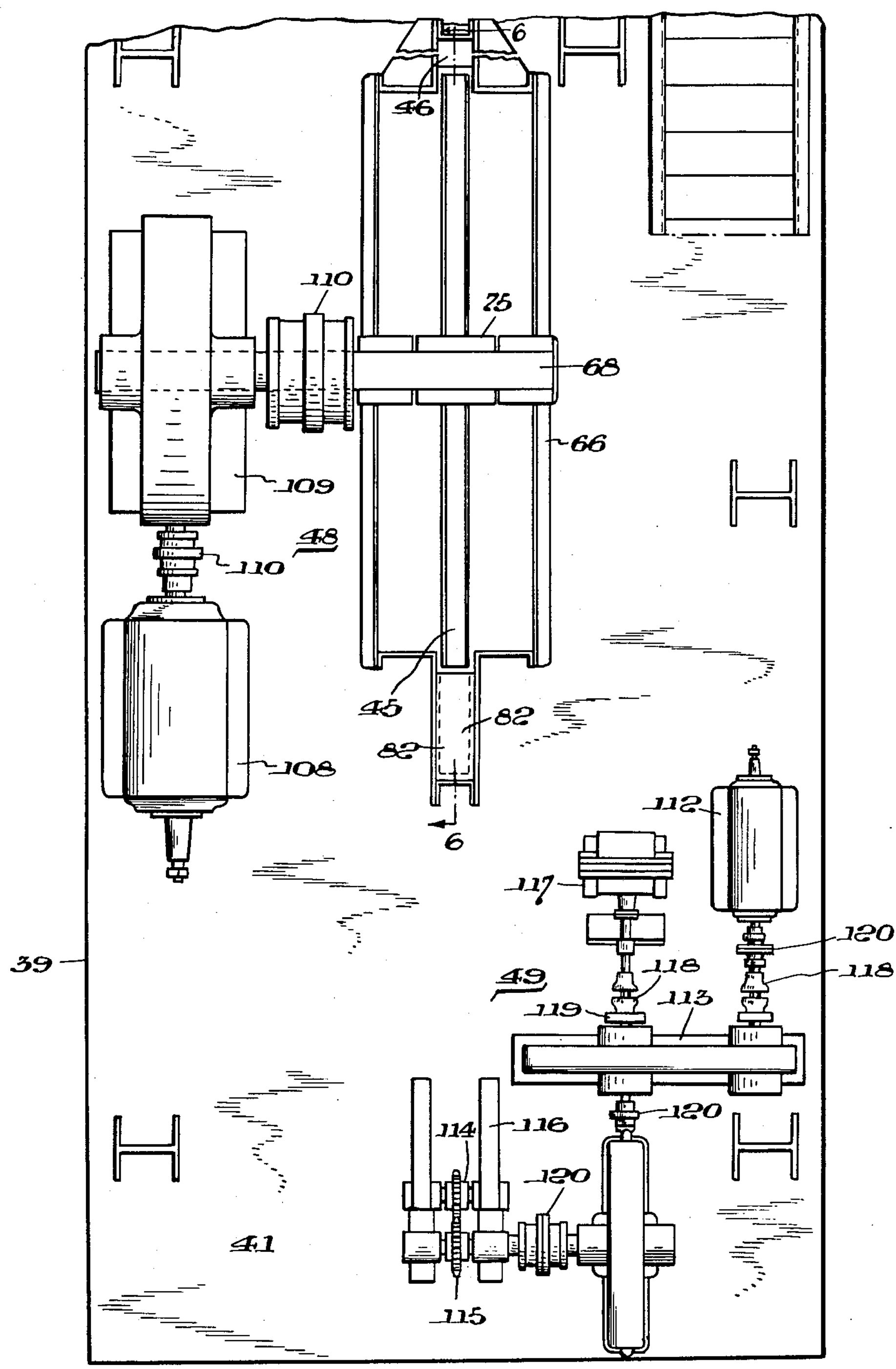
Figure 4 is a top plan view of the lower part of the rear portion of the coal unit shown in Figure 2, illustrating the relative position of the coal wheel pump, its driving mechanism, and the traction drive mechanism for the coal feed unit.

In general, the charging unit 39 comprises a movable platform 41 mounted on four wheels 42 which run on rails 43 and support a coal hopper 44, a rotary coal pump in the form of a positive displacement pump or charging wheel 45, a charging tube 46 with spaced supporting rollers 47 therefor, a drive 48, Fig. 4, for the charging wheel 45, a traction drive 49 for the charging unit 39, and an operating cab 50 for an operator from which all operations are controlled.

In general, the traction unit 40 for the charging unit 39 comprises a framework structure 51 with wheels 52 which ride on the pusher machine tracks 35, a superstructure comprising oppositely disposed rails 53 on which the spaced rollers 47 for the tube 46 ride, and between which the charging unit 39 moves in positioning it into charging relation with the individual oven chambers 21, walkways 54 alongside the traction unit at upper and lower levels, a spillage hopper 55, two spillage troughs 56 connecting the spillage hopper 55 with the coal feed hopper 44, a traction drive 57 for movement of the machine 38 as a whole up and down the pusher machine tracks 35, and an electrical control house.

The charging wheel coal pump 45, Figs. 6, 7, comprises a wheel having spokes 58 and movable blades 59 retractably extensible through slots 60 in the rim 61 of the wheel. The rim is enclosed on its outer side by a casing 62 to form an outer annular chamber 63 in which the blades rotate. The rim 61 of the wheel forms the inner wall or base of the chamber 63. The interior of the wheel within its rim 61 is encased by oppositely disposed side casing plates 65 to provide an inner chamber 64 each side of which comprises a support for each side of the wheel in the form of a spider 66, Figs. 6, 7, with an integral bearing 67 for a drive shaft 68 for the wheel 45.

The spider 66 is composed of carbon steel, and four carbon steel casing plates 65 which are provided on the spiders on each side of the wheel to form the side casing for the inner chamber 64. The casing for the outer annular chamber 63 is formed by outer circumferential plates 62 with four perimetrical segmental side casing plates 70 on each side thereof and bolted to the circumferential plates 62 to form the inwardly open chamber 63, all the walls of which are preferably composed of type 304 stainless steel.

The wheel proper comprises six spokes 58, six blades 59, with removable cam follower rollers 71, six rim segments 72 spaced to provide slots 60 through which the blades 59 extend, two rim plates 74, and a center hub 75, provided with a keyway 76 for attaching it to the drive shaft 68.

Each spoke 58 is bolted to the center hub 75 and to one rim segment 72, and a rim plate 74 bolted on each side of the wheel to the rim segments 72 by the bolts 73 that pass through the spokes 58. Each two adjacent rim segments 72 are spaced from each other to leave the slots 60 through which the blades 59 extend into the outer annular chamber 63.

All parts of the wheel proper are composed of carbon steel except the blades and wheel bushings which are composed of hard bronze, and it will be understood of course, that in fabrication an assembly of the wheel and casing, proper clearance is maintained so that the wheel will revolve freely without interference with the casing and especially the baffle plate 76 forming a part of the coal outlet 77, as hereinafter noted.

The movement of the blades 59 during rotation of the wheel 45 is controlled by the action of the rollers 71 in the cam tracks 78 located within the inner chamber 64. The cam design is such that the blades 59 in one revolution of the wheel are fully extended for 240°, and are retracted backward out of the outer chamber 63 toward the center of the wheel, from a fully extended position to a position necessary to clear the outlet baffle plate 76 which is tangent to the rim 61 of the wheel, in rotation of the wheel through a further movement of 60°, in which retracted position the blades 59 remain until further movement of another 60°, whereupon the blades 59 are advanced again into the annular chamber 63, the baffle 76 merging with the rim 61 midway of such latter 120°.

Due to expected leakage between the coal compartment or outer annular space 63 of the wheel and the inner chamber 64 on the inside of the rim through the space between the latter and the stationary casing within which the rim and blades rotate together as a unit, internally rotatable plates 79 are attached to the wheel in position for rotation close to the inner periphery of the outer annular casing 70 on opposite sides of the wheel, for rotation with the wheel.

These plates or wipers 79, are provided to wipe any leakage of coal into two rectangular outlets 80 on each side of the annular outer casing and its chamber 63, for discharge into two chutes 81 on opposite sides of the annular outer chamber 63.

These chutes 81 discharge into spillage troughs 56 supported on the traction unit of the machine. A conveyor such as the "Hapman" type comprising flexible links and transverse flights, is arranged in such troughs or conduit 56 to run therethrough and convey the coal back to the top of the coal feed hopper 44, Fig. 1, so that the wheel 45 is self cleaning.

Since in operation there will be no coal in the portion of the outer annular compartment between the outlet baffle plate 76 and the coal inlet 82 to the wheel 45 from the hopper 44, and as the blades 59 travel through this unfilled space with small clearance on the outer annular casing 70, this portion of the wheel will act as an air compressor. A vent means to the atmosphere, or a pipe 83 is therefore connected to the portion of the annular outer chamber 63 on each side thereof near the coal inlet 82 to release this compressed air.

The pipe, when it is employed as the air release, is also connected with the coal hopper near the bottom thereof to release the air into the coal wherein it agitates the coal in the hopper and thus insures a positive flow of coal into the charging wheel 45.

The side plates 65 of the wheel are each provided with an access opening indicated at 84 in Fig. 7, which open on the center line of the cam track 78, for inspection and lubrication of the cam followers 71, which are arranged within the inner chamber 64. These cam tracks 78 are supported on the aforementioned spiders 66, using shims for their adjustment.

The charging tube 46 is designed to fit the standard coke oven leveler doorway 29 which is square in cross section, and is restricted in width and height to confine the usual leveler bar to movement which clears the top and side walls of the oven masonry in the coke oven chambers 21, although, of course, the tube 46 and doorway 29 may be shaped otherwise, without departing from this invention.

Accordingly, the tube 46 Figs. 8, 9, is fabricated rectangular in cross section by welding 85 from type 304 stainless steel although, of course, the tube 46 may have other forms and shapes, and of different composition compatible with its intended use. As shown, the tube is 7.25" wide and 10" high inside the top and bottom plates 86, 87, being ½" plate and the side plates 88, ⅜" thick. The tube is a rigid straight non-sagging tube free of burrs, weld splatter, warps, etc., with no welds on the inside corners, so that the inside of the tube is smooth.

The adjacent plates, lengthwise of the tube, are connected together by means of outside flanges 89, and rivets 90, all as indicated in Figs. 6, 8, and 9.

The tube 46 is rigidly connected with the outer annular channel 63 at the region of the baffle plate 76 by means of an upwardly directed bend 91 inclined toward the oven battery 20, so that the main length of the tube 46, which is to extend inside the chamber is supported on a straight line at the level of the leveler doorways 29 of the oven chambers, all as indicated in Figs. 1, 6 and 7.

As will be noted in Fig. 6, the outlet baffle plate 76 forms a continuation of the top of the tube, to direct the flow of coal therethrough from the charging wheel. In the embodiment shown, the oven for which the machine was designed is about 38 feet long and so the straight line portion 92 of the tube 46 is somewhat longer than the length of the oven chambers.

Figure 5:
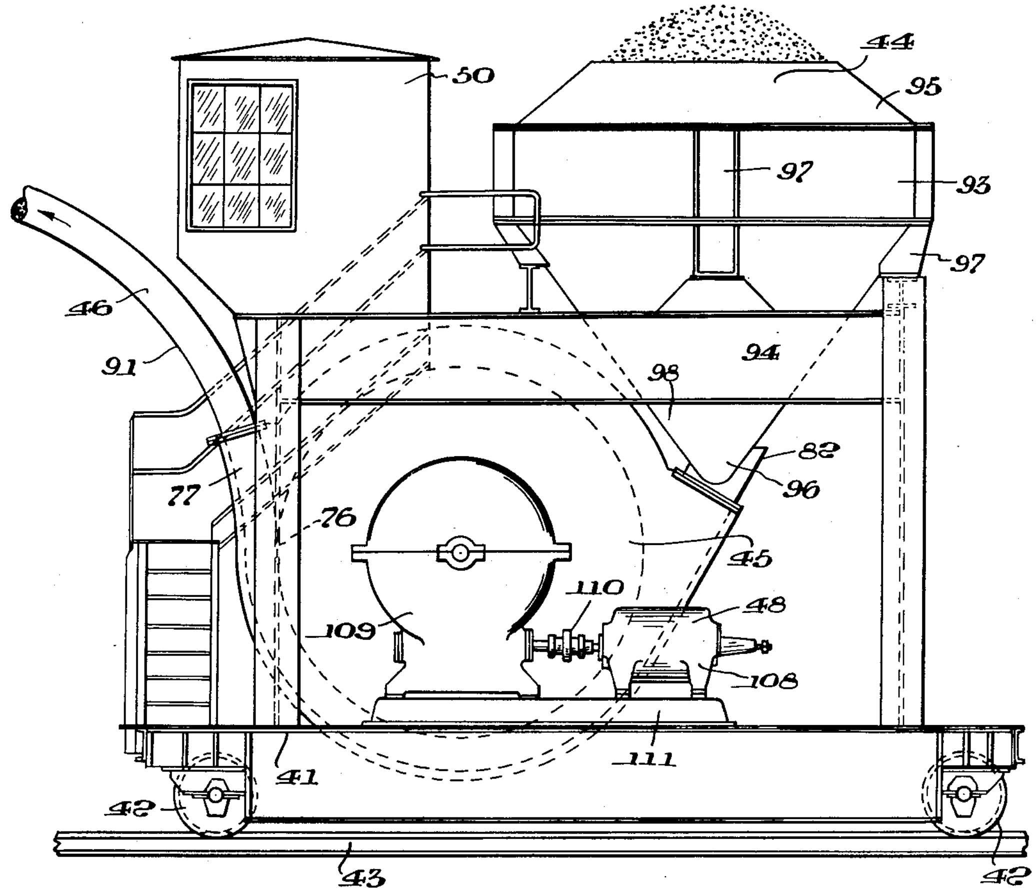
Figure 5 is a side elevational view of the left hand side of the machine as shown in Figure 2; and illustrating the relation between the hopper, tube and coal feed wheel pump of the invention.

The coal hopper 44, Figs. 1 and 5, comprises a straight cylindrical shell portion 93, 11'0" inside diameter, and 2'0" in height with a conical bottom 94 and conical cover 95 and is fabricated by welding 5/16" type 304 stainless steel plate. This hopper 44 is provided with a bottom outlet nozzle 96 rectangular in cross-section to match the inlet flanged connection 82 of the charging wheel, and is provided with the necessary flanges, supports and stiffeners 97.

The hopper is also provided with three 9" diameter openings 98 for attaching porous stone discs (not shown) which shall be flush with the inside wall of the cone of the bottom, near the bottom outlet 96 for connection of the line 83 for the admission of air for coal agitation.

For supporting the tube 46 when outside the oven chambers 21, and during its movement into and out of said chambers upon movement of the charging unit towards and from the pusher side face 27 of the battery 20, the rollers 47 (Figs. 1, 2, 10) are constituted of four 12" diameter rollers 99, which are supported on axles 100 of 8" pipe, which latter are carried by 9" diameter double flanged wheels 101 at each end. These rollers 47 are connected together by oppositely disposed hinged arms or levers 107 which may fold and unfold. This system of rollers is actuated by the movement of the charging unit 39, being connected at one end of the system to the charging unit 39, as at 103, to move to and from the pusher side face 27 of the battery 20. The arms fold up near the front of the machine, as shown in Fig. 10, as the charging unit moves forward, thus stacking the rollers 99 on inclined support 104, beyond the middle rail 53, thus folding the links or levers 102 on an inclined plane beyond the end of the outer rails 53. These rails are all supported by the columns 105 of the superstructure of the traction unit 40, said structure also supporting an advance fulcrum supporting roller 106 for the tube 46 adjacent the pusher side face of the battery 20, as shown in Figs. 1 and 10.

The spillage hopper 55 is equipped, Fig. 1, with a hinged spillage chute 107 which is actuated by movement of the charging unit to rotate against the oven doors 28, under the leveler door at 29, when the charging unit 39 moves toward the oven side, and to pull away from the door 28, when the charging tube 46 is withdrawn from the oven chambers 21.

The spillage hopper 55 terminates in a sloping bottom with a nozzle on each side to serve as the inlet and outlet connections through which the flexible links and transverse flights of the conveyor 56 pass to remove spilled coal and return it to the hopper 44. The conveyor 56 also comprises a trough under each leakage outlet for coal 81, Figs. 6 and 7, through which this endless conveyor runs.

The charging wheel drive 48, Figs. 4 and 5 comprises one 50 horse power mill type motor 108 capable of 600 R. P. M., a 30:1 worm speed reducer 109 capable of delivering at least 50 H. P. under normal running conditions, two "Fast" couplings 110, and a common base 111 for the motor and speed reducer. The electrical controls for this drive are mounted in the control room on the traction unit 39.

The traction drive 49 for the charging unit 39, Fig. 4, comprises a 10 horse power motor 112 running at a speed of 1240 R. P. M., a worm gear speed reducer 113 having a reduction ratio of 60:1, sprockets 114 and chain 115, pillow block bearings 116, a Dake Engine No. 3½ indicated at 117, two jaw clutches 118 with lever 119, and "Fast" couplings 120 to take care of misalignment.

The forward and backward travel of the charging unit into and out of the oven chambers is controlled by the operator, plus a timer and limit switches, and circuit, diagrammatically illustrated in Fig. 11 and hereinafter described. All controls are mounted in the electrical control room on the traction unit 39. A limit switch 123 (Fig. 11) stops the forward travel of the unit 39 by drive 49 when the unit travels far enough to insert the open end of the charging tube 46 just inside the pusher side oven doorway 29. A timer 126 permits a dwell period and starts the charging unit 39 further forward after said dwell period and also the drive 48 for the charging wheel 45.

The charging unit 39 continues to move forward at a uniform speed for the balance of the length of the oven chambers 21. Upon completion of the charge, a limit switch 125 reverses the traction drive 49 to move the unit 39 away from the oven toward the rear of the traction unit 40, where a limit switch 127 stops the unit 39.

The forward speed is approximately 23 ft. per minute. The reverse speed of the unit 39 is approximately 46 ft. per minute. The Dake engine is used in case of power failure and provides a means of withdrawing the charging unit 39 and its tube 46 from the oven.

The operating cab 50 on the unit 39 contains an operating panel with operating controls in such manner that the operator has easy access to said controls and the operator may start and stop various operations with a minimum effort and an unobstructed view from the unit 39, as it moves backwardly and forwardly in the oven battery. This panel also has the controls for operation of the drive unit 48 for the charging wheel 45 and includes a switch for decellerating the feed near the end of the advancing movement of the tube 46.

The traction drive 57, Fig. 2, for the traction unit 40, comprises spur gears and speed reducer 121 and motor 122 mounted on the traction unit 40 with connection to two of the six wheels 52, to drive the entire machine 38 up and down the pusher machine tracks 35, the other four wheels 52 acting as idlers. The electrical controls for the drive 57 are mounted in the electrical control room of this unit, but with the operating controls in the cab 50 on the charging wheel unit 39.

In operation, the machine operates to carry out the following method of charging the individual oven chambers in sequence, for which the machine is primarily designed and adapted.

The charging unit 39 travels crosswise of the pusher machine track 35, toward the oven 20 while charging, and away from the oven after charging.

The traction unit 40 travels on the pusher track rails 35 and parallel to the oven battery 20 and moves the charging unit from one oven chamber 21 to another.

The travel of the charging unit 39 and the traction unit 40 is controlled by one operator, located in the cab 50 on the charging unit 39. The travel of the traction unit 40 is also controlled by another limit switch (not shown), so that it will be impossible to move the traction unit 40, while the charging unit 39 is away from its extreme rear position farthest remote from the oven battery 20.

*Cycle of operation*

Starting from a location in which an oven 21 has been charged and the charging unit 39 is in the extreme rear position. The operator in cab 50 moves the entire machine by means of the traction unit 40 from the oven 21 charged, toward the next oven 21 to be charged, and then stops the machine at a coal loading station 37 nearest thereto. Said stations are located approximately every 9th oven. The operator opens a coal feed gate at the station 37, loads the coal hopper 44 with the required amount of coal, closes the gate, and moves the traction unit 40 to the next oven 21 which is to be charged, where the operator spots or centers the machine 38 with the oven 21, for charging with tube 46 in alignment with its leveler doorway. A bench operator opens the leveler door. The machine operator starts the traction drive 49 for moving the charging unit 39 toward the oven chamber 21, inserting the charging tube 46 into the oven chambers. The limit switch 123, externally located, stops the forward movement of the charging unit traction drive 49 so that the open end of the charging tube 46 dwells just inside the oven chamber 21. This same limit switch also starts the charging wheel drive 48 and energizes that timing device 126, which permits the charging wheel drive 48 to operate the charging wheel 45 a predetermined length of time, to charge an initial triangular volume in the oven bounded by the oven floor, the pusher side oven door and the angle of repose of the coal, as indicated in the oven chamber 21 alongside the pusher side door 28 in Fig. 1. The timer 126 then starts the traction drive 49 of the charging unit 39 again, moving the unit further toward the battery 20, and the open end of the charging tube 46 across the top of oven 21, from the pusher side 27 toward the coke side 26 of the battery 20, charging coal into the oven as it moves. The revolutions per minute of the charging wheel 45 and the forward speed of the charging unit 39 are co-related so that a uniform charge is placed in the oven 21 to the height of the bottom of the charging tube 46, the coal rolling down the slope of previously charged coal, to the oven floor. The charging tube is supported on the coal as it moves along the chamber. It will be noted that the charge being placed into the oven during the latter movement of the tube 46 is a parallelogram bounded by the oven floor, the underside of the charging tube and two sides parallel to the angle of repose of the coal. When the coal charge parallelogram is long enough to cover the entire oven floor, or when the angle of repose side of the charge intersects the corner formed by the door 28 at the coke side and the oven floor, the externally located limit switch 124 energizes a controller, which may be in the timer, or separately therefrom, which gradually decellerates the charging wheel drive and brings the wheel to a stop when the charge is complete. During this decelleration the charging wheel fills the last triangular volume of coal up to the level of the tube at the coke side door, and while filling the last triangular volume in the oven, the forward speed of the charging unit is constant, while the speed of the charging wheel 45 gradually decreases.

When the charging unit reaches the most extreme forward position and the open end of the charging tube is near the coke side of the battery, the externally located limit switch 125 reverses the traction drive 49 of the charging unit 39 and it moves backward away from the oven, withdrawing the tube 46 from the oven with the charge leveled. The bench operator then closes the leveler door and one operating cycle has been completed. The operator then repeats the above cycle.

*Charging wheel*

The wheel rotates at approximately 20 R. P. M., normal speed, for the greater part of the charging operation, but is gradually decelerated to a stop while filling the last triangular shaped charge in the oven as above described.

Each blade when extended rotates through the coal inlet 82 of the charging wheel and immediately pushes the coal trapped in front of it on the rim 61 toward the outlet 77. As each blade 59 approaches the outlet 77, it is retracted, so as to clear the outlet baffle plate 76, and then is pushed out again to the extended position for the next revolution. With six blades, and the wheel revolving continuously, there is a continuous mechanical push against the coal, which push positively displaces the coal particles, which follow the path of the baffle plate 76 into the charging tube 46. In calculating the power required to drive the wheel 45 and push the coal through the tube, a friction coefficient for coal on steel of 1.0 is assumed, the weight of coal in the tube 46 amounting to 1825 lb. for a length of 73 ft., the cross sectional area of the tube being 72 sq. in., and coal weighing 50 lb. cu. ft., and the mean diameter of the wheel being 10′–0″ at the effective center line of the blades.

The force required to push the coal through the tube, using the above figures is 1825 lbs.×coeff. 1.0=1825 lbs. on effective center line of blades.

The torque required is 1825×60″=109,500 in lb.

The H. P. required at 100% efficiency, at 20 R. P. M.

$$H.\,P.=\frac{109500\times 6.28\times 20}{12\times 33000}=34.73$$

This power should be somewhat in excess of that required due to the high coefficient of friction assumed for the above calculations. The tube contemplated by the invention being made of stainless steel, will soon attain a polished surface, and the friction will be greatly reduced. However, to take care of contingencies a 50 H. P. Mill type motor drives the wheel. This motor will develop 5250 in lb. torque at 600 R. P. M. (normal running torque) and a maximum torque of 21,000 in lb. for starting or emergency loads. Under normal conditions and at 20 R. P. M., through a reduction ratio of 30:1, and an assumed efficiency of 80% for the speed reducer, 126,000 in lb. of torque will be delivered by the above motor at the wheel. The push developed against the coal will be 2100 lb. normally, with a maximum push of 8400 lb. which is 4.6 times the calculated force above. This is more than ample for overcoming contingencies such as sporadic packing of coal, etc.

The wheel revolving at 20 R. P. M. develops a velocity of 11.5 ft. per sec. on the effective diameter of the blades.

The mean circumference of the annular space, in which the coal is retained being 31.4′, and the cross sectional area being 72 sq. ft. each revolution of the wheel at 100% efficiency should deliver 31.4×.5=15.7 cu. ft. of coal. With an assumed efficiency of the wheel of 90%, 14. cu. ft. of coal is delivered per revolution or 14×20=280 cu. ft. per min. or 560 cu. ft. in 2 min. The capacity of the modern oven for which the machine was designed in 568 cu. ft.

Due to expected leakage between the coal compartment or annular space of the charging wheel and the inside of the periphery of the wheel casing, the external plates 79 on opposite sides of the rim 61 wipe the coal into a rectangular opening 80 on each side of the wheel. The coal falls through these openings into chutes 81 which discharge into the spillage troughs, supported on the traction unit 40 of the machine. A "Hapman" conveyor running in these troughs carries the coal to the top of the coal hopper 44, so that the wheel 45 is self cleaning. Since, in the operation there is no coal in the portion of the compartment of the charging wheel 45 between the outlet baffle plate 76 and the coal inlet 82 at the top of the wheel, and as the blades travel through this unfilled space with small clearance on the casing, this portion of the wheel will act as an air compressor. The vents (not shown), or the pipe 83 connecting into each side of the air compartment near the coal inlet will release this air into the surrounding atmosphere or the coal hopper 44 near the bottom, thus agitating the coal to insure positive flow of coal into the charging wheel.

*Charging tube*

In operation the forward portion of the tube 46 is partly inserted into a hot oven chamber for a distance of perhaps 38 ft. in the form of a cantilever, which reciprocates in and out free of contact with the oven chamber masonry. Although surrounded with hot gas, the tube will be cooled by the coal which travels through it at a high velocity of, for instance, 11.5 ft. per sec. The maximum temperature to which the tube will build up within the oven chamber 21 should not be above approximately 200° F. due to the short time that is required to be within the chamber before it is withdrawn from the oven after the charge is complete. This operation of the tube is comparable to that of the present conventional leveler bar, which does not under normal operation get excessively hot. The gas liberated immediately after the placing of the charge, is cool due to the great volume of moisture liberated at this time, and due to the short residence time of the gas in the oven caused by the steam jet at the ascension pipe, and also due to the rapid cooling of the oven brickwork due to absorption of heat by the coal.

The operation of the remaining parts of the machine is readily apparent from their description in the foregoing part of this specification, and hence they need no further illustration.

The invention is not limited in all its aspects to the method and apparatus described by way of the preferred embodiment since, as is above pointed out the forward portion of the tube may be made telescopic and only the forward portion reciprocated into and out of the oven chambers, in accordance with the next preferred embodiment, depicted in Figs. 12 and 13 and hereinafter described.

Figure 13:
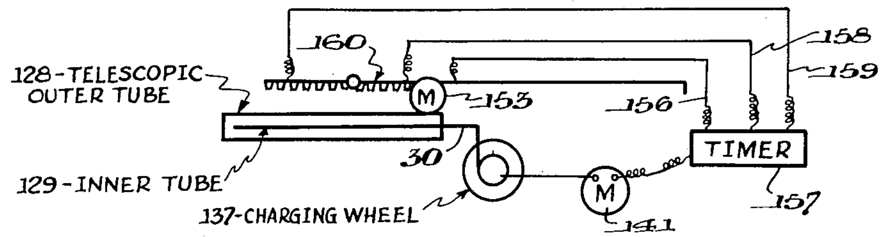
Fig. 13 is a view like Figure 11 for illustrating the synchronous operation of the next preferred embodiment illustrated in Figure 12.

Referring to Figs. 12 and 13: the charging unit differs from the unit as shown in Figs. 1–11, in having the forward portion 128 of the tube 129 that projects into the oven chamber 21, as a separately reciprocable part telescopically mounted to slide over and along the outside of the inner part 130 of the tube 129 that remains outside the oven chambers 21 when the other forward part 128 is projected into the coking chambers through their leveler bar or chock doorways 29.

In this embodiment, only the forward tube portion 128 is advanced to and from the oven chambers, the remaining parts of the charging unit 39 remaining stationary. Consequently any coal remaining inside the forward part 128 of the tube 129 after charging as above described in connection with Figs. 1 to 11, will be forced out of the foretube part and onto the top of the oven charge, as the forward part 128 is withdrawn over that stationary part 130. No further leveling of the coal charge is required after withdrawal of the forward tube portion 128.

The telescopic design of charging tube 129 greatly simplifies the arrangement of the charging device 39 on the pusher machine, or a separate machine for such mechanisms, since it is no longer necessary for the charging wheel to travel toward and away from the oven.

In this embodiment, as illustrated in Figs. 12 and 13, the parts which correspond with like parts in Figs. 1–11, are shown as follows:

Coal is fed by pipe conveyor 131 longitudinally alongside the oven battery 20 to one of a series of hoppers 132 having bin gates 133 to chutes 134 which are at the level of the chock doors or leveler doorways 29 of the oven battery 20. These chutes 134 are actuated by an actuator 135 to discharge coal from the individual bins or compartments 132, which are individually supplied by valve mechanisms 136 with coal from conveyor 131, which control 136 for each compartment 132 is also controlled from the coal mixing station for the coal for the battery, which station supplies the conveyor 131, or an automatic control to open when the bin gates 133 close.

Coal charge for an individual oven is conveyed from the bin gate chutes 134 to the charging wheel 137 by a horizontal screw conveyor 138, which feeds by pipe 139 to the inlet 140 of the charging wheel 137 whose interior is the same as that wheel 45 employed in Figs. 1–11, except that the coal leaves at the upper half of the wheel and enters the stationary tube part 130 of tube 129.

In Fig. 12, 141 indicates the wheel drive for the wheel 137; 142, the traction drive for moving the charging unit 39 from oven to oven; 143, the oven pusher ram; 144, the ram drive; 146, the spillage conveyor to the coal bin 132. The operator's cab is shown at 147, the electrical room at 148, and stairways are indicated at 149.

The forward tube part 128 is supported for telescopic reciprocation by means of supporting rollers 150 carried by beams 151 mounted on the framework 151' of the charging unit 152. The forward tube part 128 is actuated by a charging tube drive 153 rigidly connected to the rear end of the tube part 128 for movement with it as a single unitary whole. This drive 153 has reduction gearing intermeshing through a pinion with a stationary horizontally disposed rack 154 extending over the stationary tube part 130 between the charging wheel 137 and the inner end of the part 130. Rotation of the pinion on the rack moves the tube part 128 in both directions.

The removable chock or charging door 155, is removed and replaced by a door extractor 155' on the charging machine which extractor is offset from the charging tube 129 and above upper supporting roll 150.

The operation otherwise is like that described in connection with the operation of the machine as in Figs. 1–11.

As indicated in Fig. 13, the movement of the forepart of the tube 129, that is, the tube part 128, is controlled in the same manner as the charging wheel unit 39, i. e., Fig. 13, by a dwell limit switch 156, timer 157, decellerator switch 158, reversal switch 159, and reverse stop switch 160. The charging wheel is indicated at 137 and the drive therefore at 141 in Fig. 13. An auxiliary hand winch 161, Fig. 12, is provided for emergency, and a coal spillage chute at 162. The arrangement of Figs. 1–11 is preferred, however, because of the single, rather than multipart tube 46.

While the charging system is of greater utility in side charging large ovens than prior art methods and apparatus, the new and improved side charging is of course also of utility in side charging small or low ovens.

The traction unit 40 instead of being driven by its own drive 57 may be attached to the usual pusher machine (not shown) and driven thereby.

The side charging may also be effected from both sides of the battery by means of shorter tubes and also may be used with intermittent vertical ovens as well as horizontal coke oven batteries.

Other means, such as mechanical means are contemplated as within the invention, in lieu of the electrical system for controlling the movement of the tube, and the hoppers for filling the ovens may be at one end of the batteries instead of alongside the battery as at 36, 37 and 132. The charging unit per se is of utility in other coking relations than as here combined with coke ovens for which it was conceived and primarily designed and adapted.

Hence, the invention as hereinabove set forth is embodied in a particular form of construction but may be variously embodied within the scope of the claims as hereinafter made.

I claim:

1. An arrangement for combined side charging and leveling individual coking chambers with a uniform charge of coal of predetermined character from a common supply thereof in a battery of narrow alternate coking chambers and intermediate heating walls therefor arranged side by side in a row, each of said coking chambers having a coal inlet to their upper parts from one side of the battery, and each of said heating walls comprising a heating flue system which terminates at a level below the level of the bottom of said coal inlets; said arrangement comprising a common supply for coal of predetermined character for all the oven chambers of the battery; a coal feeding unit movable alongside the battery between the common supply and the individual oven chambers for individually receiving coal from said supply and delivery of the same to the oven chambers individually in sequence, said coal feeding unit comprising a hopper for containing the entire charge for each individual chamber, a coal passage tube extensible into the oven chambers through their coal inlets at one side of the battery, means for extending the tube into and out of the oven chambers through the coal inlets during passage of coal through the tube from the hoppers, and a rotary pump comprising a curvilinear passage connecting the hopper with the tube, a rotor with retractable blades extensible into and out of the curvilinear passage, and means for controlling the movement of the blades to retract them before and extend the same after, the outlet from the curvilinear passage into the tube.

2. Apparatus as claimed in claim 1, and which includes means for collecting coal leakage from said passage, and means for passing the collected coal back into said hopper.

3. Apparatus as claimed in claim 1 and in which said curvilinear passage comprises an annular chamber, a rim rotatable in said chamber through which said spaced blades retractably extend and rotate with said rim, and in which said means for controlling the positions of said blades comprises cam means to retract them from the chamber in the part of their cycle from a point just in advance of the connection of the tube to the chamber to a point beyond such connection, and to advance the blades into the chamber for the rest of their cycle, and in which said tube comprises a telescopic tube of which only the portion which enters the oven chamber is movable toward and from the same, the remaining portion of the telescopic tube and the other aforesaid mechanisms being stationary during the insertion and withdrawal of the portion that enters the oven chambers for charging coal into the oven chambers.

4. Apparatus as claimed in claim 1, and in which the aforesaid coal feeding unit includes a carriage on which said tube, hopper and rotary pump are all mounted for movement as a unit with the carriage to and from the coking chambers, spaced movable rollers for supporting said tube during such movement, supporting members for said rollers during their movement, foldable spacer elements interconnected with said rollers and with said unit to fold up near the front of said unit and stack the rollers as the unit moves forward, and to unfold in roller spacing and tube supporting relation as the unit is withdrawn after a charging operation, and means for supporting the stack of rollers.

5. Apparatus as claimed in claim 4, and which includes a spillage hopper for collecting coal that may spill out of the open end of the tube on withdrawal from the coal inlet to the coking chamber and a conveyor for conveying the same back to the hopper for the tube.

6. Apparatus as claimed in claim 1, and in which said common supply of coal comprises a series of coal stages in a row along one side of said row of coking chambers, for supply of coal to be coked to the chambers of said row, and in which said tube hopper and rotary pump are all mounted on a carriage for movement as a unit to and from along said row of coking chambers between the same and the row of coal stages, for receiving coal from the nearest stage closest to the next coking chamber to be charged and then spotting the tube before the coal inlet of the oven chamber to be charged.

7. Apparatus as claimed in claim 1 and which said coal passage tube comprises a tube element having the forward part of said tube mounted for movement into and out of the coking chambers, means for driving the pump, means for driving the forward part of the tube into and out of a coking chamber, and automatic operating means for operating said drive means including means for temporarily arresting the forward movement of the tube when its discharge end initially enters the coal inlet to the coking chambers, timer means for starting the drive for the coal pump upon the temporary arrestment of the tube and for thereafter effecting the further movement of the tube at a constant rate into the oven while still continuing the drive of the pump, means for decelerating the drive of the pump near the end of the forward movement of the tube while the forward movement of the tube continues at its constant rate, and means for retracting the tube upon its arrival at the end of its forward movement.

8. An arrangement for combined side charging and leveling of a battery of horizontal coking chambers arranged side by side in a row with intermediate heating walls, and coke oven doors at the opposite horizontal ends of the coking chambers and a doorway in the tops of the coke oven doors on one side of the battery; said arrangement comprising coal supply bin means arranged to contain the coal for the entire battery; a carriage mounted for movement from chamber to chamber alongside the battery between the same and said coal supply bin means; a coal charging unit disposed on said carriage for feeding coal from said coal supply bin means into the oven chambers of the battery, said unit comprising a coal passage tube the forward portion of which is mounted for movement in position to be extended into the oven chambers through the doorways at the tops of the coke oven doors and in the form of a cantiliver through the tops of the oven chamber upon movement toward the side face of the battery; and a rotary pump comprising a curvilinear passage connecting the hopper with the tube, a rotor with retractable blades extensible into and out of the curvilinear passage, and means for controlling the movement of the blades to retract them before and extend the same after, the outlet from the curvilinear passage into the tube.

9. Apparatus as claimed in claim 8, and in which said rotary pump comprises a wheel with said blades retractably extensible through the rim of the wheel and a casing enclosing the rim of the wheel and forming with the rim a curvilinear coal pumping chamber through which the tube and hopper are connected for flow of coal and in which said means for controlling the movement of the blades comprises cam means for retracting the blades to pass the connection of the tube with the pump and to extend said blades for pumping of coal from the hopper, and which includes means for collecting coal leakage from the interior of the wheel and returning the same to said hopper, and rotatable scrapers within the interior of the rim of the wheel for scraping to said collecting means coal that may leak from the annular chamber into the interior of the rim.

References Cited in the file of this patent

UNITED STATES PATENTS 845,719 Schniewind ____________ Feb. 26, 1907

FOREIGN PATENTS 228,853 Germany ______________ Jan. 26, 1910